(12) United States Patent
Kang et al.

(10) Patent No.: US 8,728,350 B2
(45) Date of Patent: May 20, 2014

(54) METHOD FOR PRODUCING METAL NANOPARTICLES, INK COMPOSITION USING THE SAME AND METHOD FOR PRODUCING THE SAME

(75) Inventors: Sung Koo Kang, Gyunggi-do (KR); Dong Hoon Kim, Gyunggi-do (KR); Joon Rak Choi, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 471 days.

(21) Appl. No.: 12/926,907

(22) Filed: Dec. 16, 2010

(65) Prior Publication Data

US 2011/0232527 A1    Sep. 29, 2011

(30) Foreign Application Priority Data

Mar. 23, 2010   (KR) .......................... 10-2010-0025898

(51) Int. Cl.
*H01B 1/00* (2006.01)

(52) U.S. Cl.
USPC ................. 252/500; 74/364; 74/370; 74/374; 424/1.11; 438/597

(58) Field of Classification Search
USPC ............ 252/500; 74/247, 252, 364, 370, 373, 74/374; 424/1.11; 438/597
See application file for complete search history.

(56) References Cited

U.S. PATENT DOCUMENTS

| | | | |
|---|---|---|---|
| 2006/0254387 A1 | 11/2006 | Lee et al. | |
| 2007/0180954 A1* | 8/2007 | Kim et al. | ......................... 75/373 |
| 2008/0085594 A1 | 4/2008 | Li et al. | |
| 2008/0089836 A1* | 4/2008 | Hainfeld | ...................... 424/1.11 |
| 2008/0138643 A1 | 6/2008 | Lee et al. | |
| 2008/0148904 A1 | 6/2008 | Tomonari et al. | |
| 2008/0207934 A1 | 8/2008 | Kim et al. | |
| 2010/0031775 A1 | 2/2010 | Seo et al. | |
| 2010/0279006 A1 | 11/2010 | Sato et al. | |

FOREIGN PATENT DOCUMENTS

| | | |
|---|---|---|
| JP | 2005-036309 | 2/2005 |
| JP | 2005-298891 | 10/2005 |
| JP | 2006-89786 | 4/2006 |
| JP | 2006-299329 | 11/2006 |
| JP | 2006-328532 | 12/2006 |

(Continued)

OTHER PUBLICATIONS

Mazumder et al., "Oleylamine-Mediated Sythesis of Pd Nanoparticles for Catalytic Formic Acid Oxidation", J. Am. Chem. Soc., 2009, 131, 4588-4589.*

(Continued)

*Primary Examiner* — Khanh Tuan Nguyen

(57) ABSTRACT

There are provided a method for producing metal nanoparticles including preparing a first solution including a metal precursor, an amine, and a non-aqueous solvent; producing metal nanoparticles capped with amine by heating, agitating, and reducing the first solution; preparing a second solution by washing a non-reactive amine among the produced metal nanoparticles and dispersing the metal nanoparticles in the non-aqueous solvent; and partially capping an acid on the metal nanoparticles dispersed by adding the acid to the second solution and heating and agitating it, an ink composition using the same, and a method for producing the same. The exemplary embodiments of the present invention can provide a method for producing metal nanoparticles having surface stability, excellent adhesion, an effect of reducing cracks by modifying the substituents of metal nanoparticles, an ink composition using the same, and a method for producing the same.

15 Claims, 3 Drawing Sheets

(56) References Cited

FOREIGN PATENT DOCUMENTS

| | | |
|---|---|---|
| JP | 2007-146271 | 6/2007 |
| JP | 2008-95194 | 4/2008 |
| JP | 2008-133527 | 6/2008 |
| JP | 2008-150701 | 7/2008 |
| JP | 2008-538593 | 10/2008 |
| JP | 2008-297580 | 12/2008 |
| JP | 2009-30084 | 2/2009 |
| JP | 2009-91621 | 4/2009 |
| JP | 2010-37647 | 2/2010 |
| KR | 10-0814295 | 3/2008 |
| KR | 10-0818195 | 3/2008 |
| WO | 2006/019144 | 2/2006 |
| WO | 2006/115560 | 11/2006 |

OTHER PUBLICATIONS

Japanese Office Action issued Oct. 30, 2012 in corresponding Japanese Patent Application No. 2010-283110.

Yang Li et al, "The synthesis of Amine-capped magnetic (Fe, Mn, Co, Ni) oxide nanocrystals and their surface modification for aqueous dispersibility", vol. 16, pp. 2175-2180, 2006.

Korean Office Action issued Sep. 20, 2011 in corresponding Korean Patent Application 10-2010-0025898.

Japanese Office Action mailed Aug. 20, 2013 in corresponding Japanese Application No. 2010-283110.

* cited by examiner

METHOD FOR PRODUCING METAL NANOPARTICLES, INK COMPOSITION USING THE SAME AND METHOD FOR PRODUCING THE SAME

CROSS-REFERENCE TO RELATED APPLICATIONS

This application claims the priority of Korean Patent Application No. 10-2010-0025898 filed on Mar. 23, 2010, in the Korean Intellectual Property Office, the disclosure of which is incorporated herein by reference.

BACKGROUND OF THE INVENTION

1. Field of the Invention

The present invention relates to a method for producing metal nanoparticles, an ink composition using the same, and a method for producing the same, and more particularly, to a method for producing metal nanoparticles having surface stability, excellent adhesion, and a crack reducing effect by modifying the substituents of metal nanoparticles, an ink composition using the same, and a method for producing the same.

2. Description of the Related Art

Since a noncontact direct writing technology using an inkjet printer can discharge a fixed amount of ink to an exact location, it has the advantages of saving on material costs and shortening production time.

For the industrial applications of the inkjet printer, there is a need to develop ink suitable for the inkjet printer. As a result, in order to develop materials for inkjet printing, research into a method capable of mass-producing metal particles at low cost has been frequently conducted.

As the recent interest in solar cells is increased, a demand for ink and paste containing silver nanoparticles having excellent electrical characteristics has sharply increased.

A wet particle synthesizing method has an advantage in that the synthesized metal particles have a high yield; however, capping the surfaces of particles with various types of dispersants is required in order to secure the stability of particles. In connection with this problem, a method for producing metal particles using a fatty acid or an aliphatic amine around metal has been developed in the related art. The method for capping the silver nanoparticles with the fatty acid has excellent stability after producing ink, but causes cracks after sintering and has weak adhesion with a substrate. As a result, the method has many drawbacks as an electronic material. On the other hand, the method for capping the silver nanoparticles with the aliphatic amine has excellent characteristics as an electronic material due to a lower crack generation rate and strong adhesion with a substrate, but has the drawback of degrading the stability of particles.

Therefore, in order to synthesize metal nanoparticles having both an amine and an acid, when synthesizing the metal nanoparticles by inputting both an amine and an acid at the same time, an amide is produced due to the reaction of the amine and the acid, which exists in a synthesis solution as a type of an organic matter difficult to wash.

SUMMARY OF THE INVENTION

An aspect of the present invention is to provide a method for producing metal nanoparticles having surface stability, excellent adhesion, an effect of reducing cracks by modifying substituent of metal nanoparticles, a low-temperature sinterable ink composition using the same, and a method for producing the same.

According to an aspect of the present invention, there is provided a method for producing metal nanoparticles, including: preparing a first solution including a metal precursor, an amine, and a non-aqueous solvent; producing metal nanoparticles capped with the amine by heating, agitating, and reducing the first solution; preparing a second solution by washing a non-reactive amine among the produced metal nanoparticles and dispersing the metal nanoparticles in the non-aqueous solvent; and partially capping an acid on the metal nanoparticles dispersed by adding the acid to the second solution and heating and agitating it.

The metal precursor may include at least one metal selected from the group consisting of gold, silver, copper, nickel, cobalt, platinum, palladium, and an alloy thereof.

The amine may have 6 to 30 carbon atoms and be at least one of a linear type, a branched type, and an annular type, and may be at least one selected from saturated and unsaturated amines.

The acid may have 6 to 30 carbon atoms and be at least one of a linear type, a branched type, and an annular type, and may be at least one selected from saturated and unsaturated amines.

The non-aqueous solvent may be selected from the group consisting of, for example, hexane, toluene, xylene, chloroform, dichloromethane, tetradecane, octadecene, chlorobenzoic acid, 1-hexadecene, 1-tetradecene, and 1-octadecene.

The heating of the first solution and the second solution may be performed at a temperature of 0° C. to 100° C.

According to another aspect of the present invention, there is provided a method for producing an ink composition, including: preparing a first solution including a metal precursor, an amine, and a non-aqueous solvent; producing metal nanoparticles capped with the amine by heating, agitating, and reducing the first solution; preparing a second solution by washing a non-reactive amine among the produced metal nanoparticles and dispersing the metal nanoparticles in the non-aqueous solvent; preparing a third solution by partially capping an acid on the metal nanoparticles dispersed by adding the acid to the second solution and heating and agitating it; and adding a viscosity modifier and a dispersant to the third solution.

The viscosity modifier may be added at 0 wt % to 20 wt % for 100 wt % of the ink composition.

The dispersant may be added at 0 wt % to 20 wt % for 100 wt % of the ink composition.

The metal precursor may include at least one metal selected from the group consisting of gold, silver, copper, nickel, cobalt, platinum, palladium, and an alloy thereof.

The amine may have 6 to 30 carbon atoms and be at least one of a linear type, a branched type, and an annular type, and may be at least one selected from saturated and unsaturated amines.

The acid may have 6 to 30 carbon atoms and be at least one of a linear type, a branched type, and an annular type, and may be at least one selected from saturated and unsaturated amines.

The non-aqueous solvent may be selected from the group consisting of, for example, hexane, toluene, xylene, chloroform, dichloromethane, tetradecane, octadecene, chlorobenzoic acid, 1-hexadecene, 1-tetradecene, and 1-octadecene.

The metal nanoparticles may be between 0 wt % and 60 wt % for 100 wt % of the ink composition.

The heating of the first solution and the second solution may be performed at a temperature of 0° C. to 100° C.

According to another aspect of the present invention, there is provided an ink composition, including: Metal nanoparticles partially capped with an amine and partially capped with an acid; a non-aqueous solvent in which the metal nanoparticles are dispersed; a viscosity modifier modifying viscosity of ink; and a dispersant improving dispersion of ink.

The viscosity modifier may be added at 0 wt % to 20 wt % for 100 wt % of the ink composition.

The dispersant may be added at 0 wt % to 20 wt % for 100 wt % of the ink composition.

The metal precursor may include at least one metal selected from the group consisting of gold, silver, copper, nickel, cobalt, platinum, palladium, and an alloy thereof.

The amine may have 6 to 30 carbon atoms and be at least one of a linear type, a branched type, and an annular type, and may be at least one selected from saturated and unsaturated amines.

The acid may have 6 to 30 carbon atoms and be at least one of a linear type, a branched type, and an annular type, and may be at least one selected from saturated and unsaturated amines.

The non-aqueous solvent may be selected from the group consisting of, for example, hexane, toluene, xylene, chloroform, dichloromethane, tetradecane, octadecene, chlorobenzoic acid, 1-hexadecene, 1-tetradecene, and 1-octadecene.

The metal nanoparticles may be between 0 wt % and 60 wt % for 100 wt % of the ink composition.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
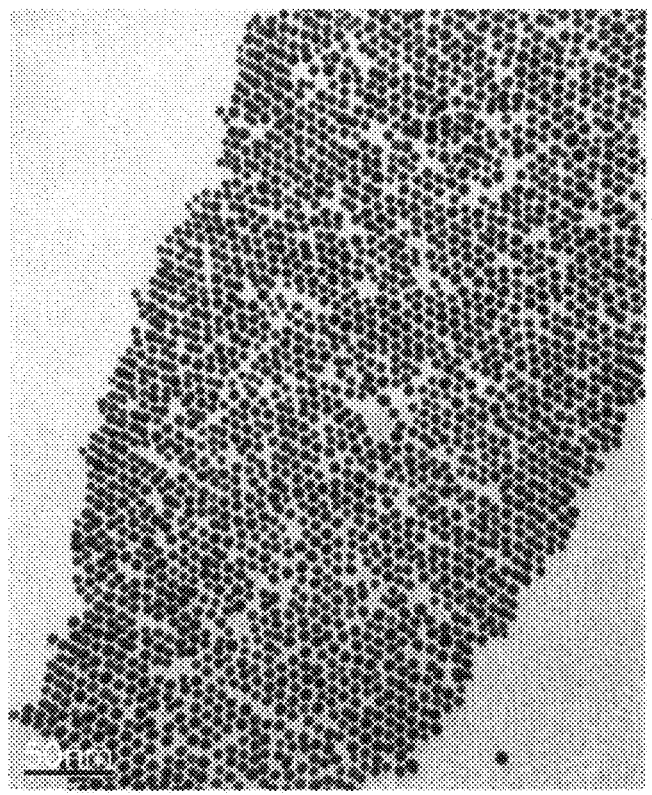
FIG. 1A is a TEM image of an ink composition containing silver nanoparticles capped with a dodecyl amine.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and sizes of elements may be exaggerated for clarity. Like reference numerals in the drawings denote like elements.

Hereinafter, a method for producing metal nanoparticles according to the present invention and metal nanoparticles produced according to the method will be described in more detail.

The present invention provides a method for producing metal nanoparticles having surface stability, excellent adhesion, an effect of reducing cracks by modifying a substituent under a non-aqueous solvent, an ink composition using the same, and a method for producing the same.

A method for producing metal nanoparticles according to an exemplary embodiment of the present invention includes preparing a first solution including a metal precursor, an amine, and a non-aqueous solvent, producing metal nanoparticles capped with the amine by heating, agitating, and reducing the first solution, preparing a second solution by washing a non-reactive amine among the produced metal nanoparticles and dispersing the metal nanoparticles in the non-aqueous solvent, and partially capping an acid on the metal nanoparticles dispersed by adding the acid to the second solution and heating and agitating it.

In the method for producing metal nanoparticles according to the present invention, the metal nanoparticles first capped with the amine are prepared. In this case, after preparing the first solution including the metal precursor, the amine, and the non-aqueous solvent, the first solution is heated, agitated, and reduced to prepare the metal nanoparticles capped with the amine.

The first solution prepared by mixing the metal nanoparticles and the amine in the aqueous solvent is heated and reduced at a predetermined temperature to substitute the surface of the metal nanoparticles with the amine.

In this case, as the metal precursor, at least one metal selected from the group consisting of gold, silver, copper, nickel, cobalt, platinum, palladium, and an alloy thereof may be used.

The amine has 6 to 30 carbon atoms and may be at least one of a linear type, a branched type, and an annular type, and may be at least one selected from saturated and unsaturated amines and may be a primary amine or a secondary amine. The amine has a carbon chain having a short chain and has better adhesion than the acid to surfaces of metal particles, such that it may be substituted and attached to some of the acid capped on the surfaces of the metal nanoparticles.

A detailed example of the amine may include hexyl amine, heptyl amine, dodecyl amine, oleyl amine, or the like. At least one thereof may be selected and used. It is preferable that the content of the amine is synthesized at 5 wt % to 30 wt % for 100 wt % of metal nanoparticles. If the content of the amine is below 5 wt %, there may be a problem with stability and if the content thereof exceeds 30 wt %, it is difficult to control viscosity during the production of ink.

Next, the non-reactive amine among the prepared metal nanoparticles is washed and the metal nanoparticles are dispersed in the aqueous solvent, to prepare the second solution. In this case, the non-reactive amine may be washed with an organic solvent several times, and is preferably subjected to a centrifugal separation process and a drying process after washing.

Next, some of metal nanoparticles are capped with the acid by adding, heating and agitating the metal nanoparticles capped with the obtained amine with the acid. Further, after the reaction is completed, they may be washed with an organic solvent and may be subjected to a centrifugal separation process and a drying process after washing.

The acid used in the present invention is a component acting as a dispersion stabilizer or a capping molecule, which can secure the dispersion stability by acid.

In the present invention, the acid has 6 to 30 carbon atoms and may be at least one of a linear type, a branched type, and an annular type, and may be at least one selected from saturated and unsaturated amines.

The reaction process is preferably performed through heating at a temperature of 0° C. to 100° C. for several minutes to several hours. When the heating temperature is below 0° C., it may be difficult to perform the reaction. When the temperature exceeds 100° C., acid reacts with the amine to lead to a sub-reaction in which an amide is generated, and in which the amide remains in the non-reactive organic matters without being capped. As a result, it is not easy to wash later. In order to optimize the substitution action, it is preferable that the process is also repeated several times.

The exemplary embodiment of the present invention includes a reaction sequence of first forming the metal nanoparticles capped with the amine and then, substituting some of the substituted amine into the acid. The reaction sequence is very important. When the adhesion between the acid and the metal nanoparticles compares to the adhesion between the amine and the metal nanoparticles, the adhesion between the acid and the metal nanoparticles is greater than the adhesion between the amine and the metal nanoparticles. Therefore, it is very difficult to substitute the metal nanoparticles capped with the acid into the amine and the amide is generated as a by-product of the sub-reaction.

In this case, the non-aqueous organic solvent usable in the present invention may be selected from the group consisting of, for example, hexane, toluene, xylene, chloroform, dichloromethane, tetradecane, octadecene, chlorobenzoic acid, 1-hexadecene, 1-tetradecene, and 1-octadecene. The organic solvent may be one selected therefrom alone or may be a mixture of two or more thereof. The organic solvent may be used as it is without extracting and separating the metal particles during the preparing of the metal nanoparticles capped with amine.

As described above, in the method for producing metal nanoparticles according to the present invention it is possible to mass-produce the metal nanoparticles capped with two kinds of dispersants with a simple process by substituting some of amine attached to the surfaces of the metal nanoparticles obtained at high yield into acid.

A method for producing an ink composition according to another exemplary embodiment of the present invention includes preparing a first solution including a metal precursor, an amine, and a non-aqueous solvent, producing metal nanoparticles capped with the amine by heating, agitating, and reducing the first solution, preparing a second solution by washing a non-reactive amine among the produced metal nanoparticles and dispersing the metal nanoparticles in the non-aqueous solvent, preparing a third solution by partially capping an acid in the metal nanoparticles dispersed by adding the acid to the second solution and heating and agitating it, and adding a viscosity modifier and a dispersant to the third solution.

Further, according to the method for producing an ink composition for wiring, an ink composition including the metal nanoparticles partially capped with the amine and partially capped with the acid, the non-aqueous solvent dispersing the metal nanoparticles, the viscosity modifier modifying the viscosity of ink, and the dispersant improving the dispersion of ink may be provided.

According to the present invention, the third solution prepared by capping the metal precursor with the amine and the acid may be produced by the above-mentioned producing method.

In this case, the viscosity modifier may be added to the third solution at 0 wt % to 20 wt % for 100 wt % of the entire ink composition. In this case, when the content of the viscosity modifier exceeds 20 wt %, it may be difficult to remove the organic matters in the sintering process.

Further, the dispersant may be added to the third solution at 0 wt % to 20 wt % for 100 wt % of the entire ink composition. In this case, when the content of the dispersant exceeds 20 wt %, it may be difficult to remove the organic matters in the sintering process.

The surfaces of the metal nanoparticles having the structure may be capped with two kinds of dispersant including the acid and the amine and may be produced in a non-aqueous system, such that the mixing efficiency with the non-aqueous hydrocarbon-based organic solvent is excellent, thereby making it possible to easily produce the high-concentration metal ink without a separate surfactant. Further, the metal nanoparticles having the amine attached thereto and having a lower decomposition temperature than the acid are discharged by the inkjet and then, can lower the burning temperature of the ink.

Hereinafter, the dispersion degree and storage stability of the metal nanoparticles in the ink composition according to examples of the present invention will be described with reference FIGS. 1A and 2 and Table 1.

Figure 1B:
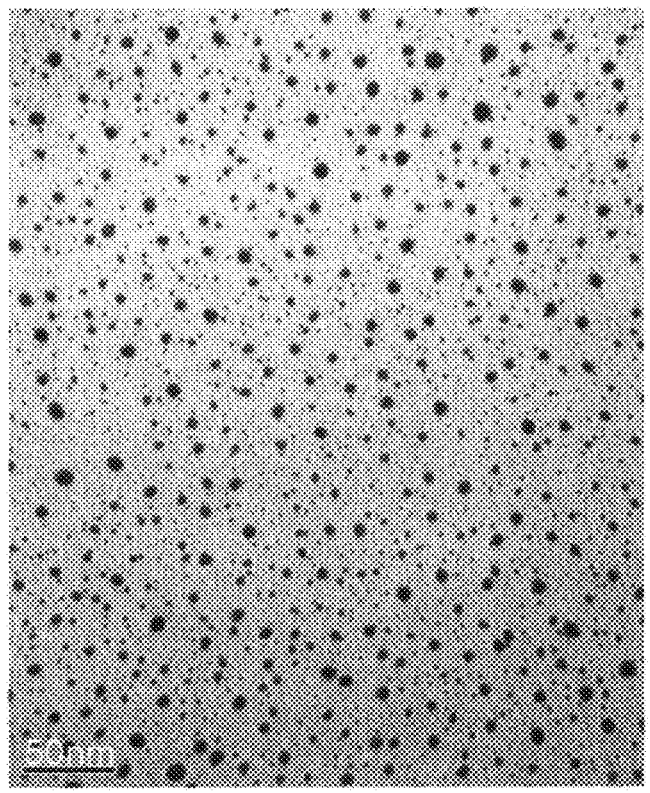
FIG. 1B is a TEM image of silver nanoparticles partially capped with the dodecyl amine and partially capped with an oleic acid.

It can be appreciated from referring to FIGS. 1A and 1B that the silver nanoparticles of FIG. 1A showing a TEM image of the ink nanoparticles containing the silver nanoparticles capped with a dodecyl amine are uniformly formed at 5 nm to 8 nm. Further, according to the examples of the present invention, FIG. 1B showing a TEM image of the silver nanoparticles partially capped with a dodecyl amine and partially capped with oleic acid are uniformly dispersed, even after the surfaces of the silver nanoparticles are substituted with acid.

Figure 2:
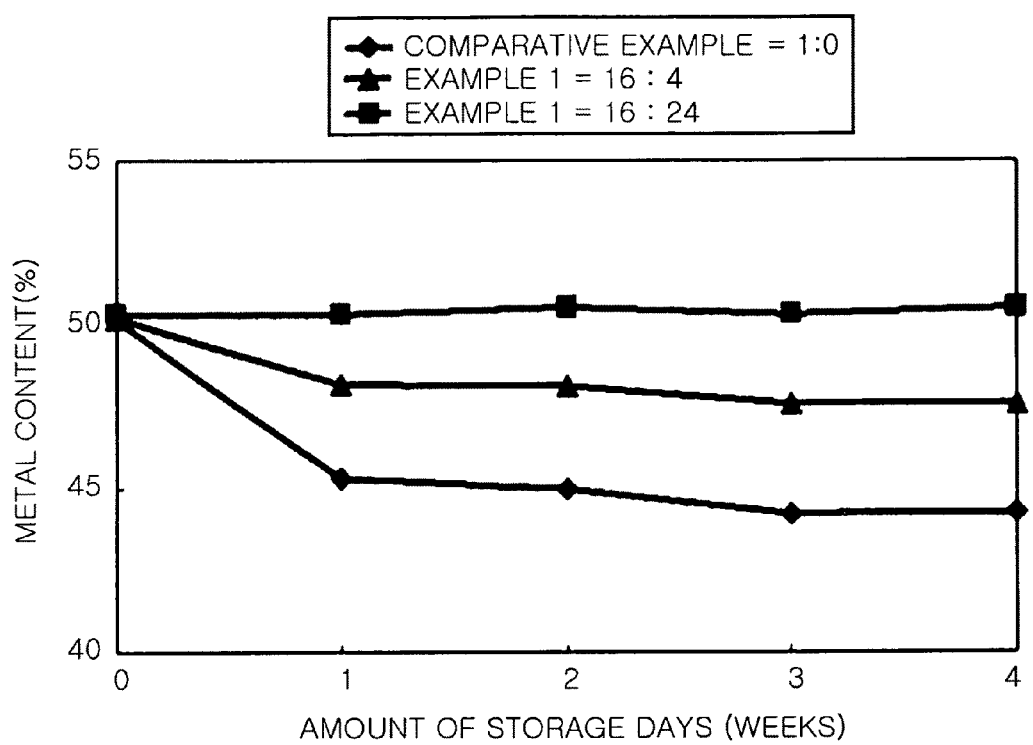
FIG. 2 is a graph showing a dispersal degree and the storage stability of metal nanoparticles in an ink composition according to an exemplary embodiment of the present invention.

It can be appreciated from referring to the following Table 1 and FIG. 2 that the viscosity cP of the ink composition containing the silver nanoparticles capped with the dodecyl amine according to the Comparative Example is remarkably reduced as compared to the viscosity of the ink composition containing the silver nanoparticles partially capped with the dodecyl amine and partially capped with oleic acid according to Examples 1 and 2 of the present invention.

Further, it can be appreciated that the silver content vol % of the ink composition containing the silver nanoparticles capped with the dodecyl amine according to the Comparative Example is remarkably reduced as time passes, as compared to the silver content of the ink composition containing the silver nanoparticles partially capped with the dodecyl amine and partially capped with the oleic acid according to Examples 1 and 2 of the present invention.

TABLE 1

| | | Initial Week | First Week | Second Week | Third Week | Fourth Week | Fifth Week |
|---|---|---|---|---|---|---|---|
| Comparative Example | Viscosity (cP) | 8.70 | 6.39 | 6.36 | 6.27 | 6.06 | 6.01 |
| | Silver Content (vol %) | 50.1 | 45.3 | 45.0 | 44.2 | 44.3 | 43.9 |
| Example 1 | Viscosity (cP) | 8.58 | 7.53 | 7.41 | 7.35 | 7.29 | 7.29 |
| | Silver Content (vol %) | 50.2 | 48.2 | 48.1 | 47.6 | 47.6 | 47.6 |
| Example 2 | Viscostiy (cP) | 11.2 | 11.1 | 11.3 | 11.4 | 11.3 | 11.3 |
| | Silver Content (vol %) | 50.3 | 50.3 | 50.5 | 50.3 | 50.5 | 50.5 |

As described above, when the ink composition containing the silver nanoparticles capped with the dodecyl amine according to the Comparative Example is applied, electrical stability is improved and crack characteristics are improved but the stability of the silver nanoparticles is degraded as time passes and the ink discharge performance is also degraded accordingly. On the other hand, when the ink composition containing the silver nanoparticles partially capped with the dodecyl amine and partially capped with the oleic acid according to Examples 1 and 2 of the present invention is applied to the wiring, the stability of the particles is improved and the ink discharge performance is also improved accordingly, while maintaining electrical stability and crack characteristics.

Accordingly, the present invention can provide metal nanoparticles having surface stability, excellent adhesion, the effect of reducing cracks by modifying the substituent of the metal nanoparticles, the ink composition using the same, and the method for producing the same.

Hereinafter, the present invention will be described with reference to the following Examples; however, the protective scope of the present invention is not limited to the following Examples.

EXAMPLE 1

A first solution in which 40 g of silver nitrate ($AgNO_3$), 120 g of dodecyl amine, and 1 L of toluene were mixed was prepared, agitated at 80° C., and reduced with 6 ml of formic acid.

Next, a non-reactive amine among the silver nanoparticles capped with amine was primarily washed by a synthesis solution in which ethanol and silver nanoparticles were mixed at 6:4 and then, was centrifugally separated at 3500 rpm for 12 minutes and dried, thereby obtaining the silver nanoparticles.

Next, 25 g of the obtained silver nanoparticles were dispersed in 500 ml of toluene.

Thereafter, the solution in which ethanol, acetone, and the silver nanoparticles were dispersed at 4:2:4 was secondarily washed. After the secondary washing was performed, the solution was centrifugally separated and dried at 4000 rpm for 15 minutes.

Next, the reaction was completed by adding the second solution in which 80 g of the dried silver nanoparticles were again dispersed in 1 L of toluene with 4 g of oleic acid and agitating it at 70° C. for 20 minutes. After the reaction was completed, the second solution was centrifugally separated at 3500 rpm for 12 minutes and dried, similar to the primary washing, thereby obtaining silver nanoparticles (dodecyl amine:oleic acid=4:1) partially capped with dodecyl amine and capped with oleic acid.

EXAMPLE 2

The first solution in which 40 g of silver nitrate ($AgNO_3$), 120 g of dodecyl amine, and 1 L of toluene were mixed was prepared, agitated at 80° C., and reduced with 6 ml of formic acid.

Next, a non-reactive amine among the silver nanoparticles capped with amine was primarily washed by a synthesis solution in which ethanol and silver nanoparticles were mixed at 6:4 and then, was centrifugally separated at 3500 rpm for 12 minutes and dried, thereby obtaining the silver nanoparticles.

Next, 25 g of the obtained silver nanoparticles were dispersed in 500 ml of toluene.

Thereafter, a solution in which ethanol, acetone, and the silver nanoparticles were dispersed at 4:2:4 was secondarily washed. After the secondary washing was performed, the solution was centrifugally separated and dried at 4000 rpm for 15 minutes.

Next, the reaction was completed by adding the second solution in which 80 g of the dried silver nanoparticles were again dispersed in 1 L of toluene with 16 g of oleic acid and agitating it at 70° C. for 20 minutes. After the reaction was completed, the second solution was centrifugally separated at 3500 rpm for 12 minutes and dried, similar to the primary washing, thereby obtaining the silver nanoparticles (dodecyl amine:oleic acid=1:1) partially capped with dodecyl amine and capped with oleic acid.

COMPARATIVE EXAMPLE

The first solution in which 40 g of silver nitrate ($AgNO_3$), 120 g of dodecyl amine, and 1 L of toluene were mixed was prepared, agitated at 80° C., and reduced with 6 ml of formic acid.

Next, a non-reactive amine among the silver nanoparticles capped with amine was primarily washed by a synthesis solution in which ethanol and silver nanoparticles were mixed at 6:4 and then, was centrifugally separated at 3500 rpm for 12 minutes and dried, thereby obtaining the silver nanoparticles.

Next, 25 g of the obtained silver nanoparticles were dispersed in 500 ml of toluene.

Thereafter, a solution in which ethanol, acetone, and the silver nanoparticles were dispersed at 4:2:4 was secondarily washed. After the secondary washing was performed, the solution was centrifugally separated and dried at 4000 rpm for 15 minutes, thereby obtaining the silver nanoparticles capped with dodecyl amine.

As set forth above, the present invention can provide a method for producing metal nanoparticles, and more particularly, to a method for producing metal nanoparticles having surface stability, excellent adhesion, which are effective in reducing cracks by modifying the substituents of metal nanoparticles, an ink composition using the same, and a method for producing the same.

Further, the exemplary embodiments of the present invention can provide a method for mass-producing metal nanoparticles having excellent sintering characteristics while revealing complementary characteristics with a simple process by simultaneously capping the surfaces of the metal nanoparticles with acid and amine having the same or different chain lengths at a proper ratio.

In addition, the exemplary embodiments of the present invention produce the metal nanoparticles in the non-aqueous solvent in order to have the excellent mixing efficiency with the non-aqueous hydrocarbon-based solvent, thereby making it possible to easily produce the high-concentration metal ink without the separate surfactant.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for producing metal nanoparticles, comprising:
    preparing a first solution including a metal precursor, an amine, and a non-aqueous solvent;
    producing metal nanoparticles capped with the amine by heating, agitating, and reducing the first solution;
    preparing a second solution by washing a non-reactive amine among the produced metal nanoparticles and dispersing the metal nanoparticles in the non-aqueous solvent; and
    partially capping an acid on the metal nanoparticles dispersed by adding the acid to the second solution and heating and agitating it.

2. The method for producing metal nanoparticles of claim 1, wherein the metal precursor includes at least one metal selected from the group consisting of gold, silver, copper, nickel, cobalt, platinum, palladium, and an alloy thereof.

3. The method for producing metal nanoparticles of claim 1, wherein the amine has 6 to 30 carbon atoms and has at least one of a linear type, a branched type, and an annular type, and is at least one selected from saturated and unsaturated amines.

4. The method for producing metal nanoparticles of claim 1, wherein the acid has 6 to 30 carbon atoms and has at least one of a linear type, a branched type, and an annular type, and is at least one selected from saturated and unsaturated amines.

5. The method for producing metal nanoparticles of claim 1, wherein the non-aqueous solvent is hexane, toluene, xylene, chloroform, dichloromethane, tetradecane, octadecene, chlorobenzoic acid, 1-hexadecene, 1-tetradecene, or 1-octadecene.

6. The method for producing metal nanoparticles of claim 1, wherein the heating of the first solution and the second solution is performed at a temperature of 0° C. to 100° C.

7. A method for producing an ink composition, comprising:
preparing a first solution including a metal precursor, an amine, and a non-aqueous solvent;
producing metal nanoparticles capped with the amine by heating, agitating, and reducing the first solution;
preparing a second solution by washing a non-reactive amine among the produced metal nanoparticles and dispersing the metal nanoparticles in the non-aqueous solvent;
preparing a third solution by partially capping an acid on the metal nanoparticles dispersed by adding the acid to the second solution and heating and agitating it; and
adding a viscosity modifier and a dispersant to the third solution.

8. The method for producing an ink composition of claim 7, wherein the viscosity modifier is added at 0 wt % to 20 wt % for 100 wt % of the ink composition.

9. The method for producing an ink composition of claim 7, wherein the dispersant is added at 0 wt % to 20 wt % for 100 wt % of the ink composition.

10. The method for producing an ink composition of claim 7, wherein the metal precursor includes at least one metal selected from the group consisting of gold, silver, copper, nickel, cobalt, platinum, palladium, and an alloy thereof.

11. The method for producing an ink composition of claim 10, wherein the metal nanoparticles are between 0 wt % and 60 wt % for 100 wt % of the ink composition.

12. The method for producing an ink composition of claim 7, wherein the amine has 6 to 30 carbon atoms and has at least one of a linear type, a branched type, and an annular type, and is at least one selected from saturated and unsaturated amines.

13. The method for producing an ink composition of claim 7, wherein the acid has 6 to 30 carbon atoms and has at least one of a linear type, a branched type, and an annular type, and is at least one selected from saturated and unsaturated amines.

14. The method for producing an ink composition of claim 7, wherein the non-aqueous solvent is hexane, toluene, xylene, chloroform, dichloromethane, tetradecane, octadecene, chlorobenzoic acid, 1-hexadecene, 1-tetradecene, or 1-octadecene.

15. The method for producing an ink composition of claim 7, wherein the heating of the first solution and the second solution is performed at a temperature of 0° C. to 100° C.

* * * * *

UNITED STATES PATENT AND TRADEMARK OFFICE
CERTIFICATE OF CORRECTION

PATENT NO.         : 8,728,350 B2
APPLICATION NO.    : 12/926907
DATED              : May 20, 2014
INVENTOR(S)        : Kang et al.

Page 1 of 1

It is certified that error appears in the above-identified patent and that said Letters Patent is hereby corrected as shown below:

On the Title Page Item [56] (Other Publications), Line 1, Delete "Sythesis" and insert -- Synthesis --, therefor.

Signed and Sealed this
Twenty-third Day of September, 2014

Michelle K. Lee
*Deputy Director of the United States Patent and Trademark Office*